(12) United States Patent
Grigat et al.

(10) Patent No.: US 9,091,019 B2
(45) Date of Patent: Jul. 28, 2015

(54) COMPOSITIONS FOR TREATING TEXTILES AND CARPET AND APPLICATIONS THEREOF

(75) Inventors: Michael Grigat, Rome, GA (US);
Ralph R. Sargent, Rome, GA (US);
Michael S. Williams, Rome, GA (US)

(73) Assignee: Peach State Labs, Inc., Rome, GA (US)

( * ) Notice: Subject to any disclaimer, the term of this patent is extended or adjusted under 35 U.S.C. 154(b) by 1090 days.

(21) Appl. No.: 12/619,097

(22) Filed: Nov. 16, 2009

(65) Prior Publication Data

US 2010/0151184 A1   Jun. 17, 2010

Related U.S. Application Data

(60) Provisional application No. 61/114,891, filed on Nov. 14, 2008, provisional application No. 61/153,577, filed on Feb. 18, 2009.

(51) Int. Cl.

| | | |
|---|---|---|
| *C09K 21/12* | (2006.01) | |
| *D06M 13/292* | (2006.01) | |
| *D06M 13/358* | (2006.01) | |
| *D06M 15/256* | (2006.01) | |
| *D06P 1/00* | (2006.01) | |
| *D06P 1/673* | (2006.01) | |

(52) U.S. Cl.
CPC .......... *D06M 13/292* (2013.01); *D06M 13/358* (2013.01); *D06M 15/256* (2013.01); *D06P 1/00* (2013.01); *D06P 1/67366* (2013.01); *D06M 2200/30* (2013.01)

(58) Field of Classification Search
CPC .................................................. C09K 21/12
USPC ........... 252/601, 602, 608, 610, 609; 510/528
See application file for complete search history.

(56) References Cited

U.S. PATENT DOCUMENTS

| | | | |
|---|---|---|---|
| 2,250,379 A | 7/1941 | Johnson | |
| 2,485,529 A | 10/1949 | Cardwell | |
| 3,689,355 A | 9/1972 | Hornbaker et al. | |
| 3,719,547 A | 3/1973 | Martin et al. | |
| 3,920,566 A | 11/1975 | Richardson et al. | |
| 3,936,316 A | 2/1976 | Gulla | |
| 3,953,386 A * | 4/1976 | Murphy et al. | 524/716 |
| 4,039,335 A * | 8/1977 | Hinata et al. | 430/574 |
| 4,135,933 A * | 1/1979 | Hinata et al. | 430/550 |
| 4,372,870 A | 2/1983 | Snyder et al. | |
| 4,444,592 A * | 4/1984 | Ludwig | 106/413 |
| 4,466,893 A | 8/1984 | Dill | |
| 4,537,684 A | 8/1985 | Gallup et al. | |
| 4,673,522 A | 6/1987 | Young | |
| 4,699,663 A | 10/1987 | Feeney, III | |
| 5,234,466 A | 8/1993 | Sargent et al. | |
| 5,492,629 A | 2/1996 | Ludwig et al. | |
| 2004/0121114 A1 * | 6/2004 | Piana et al. | 428/85 |

FOREIGN PATENT DOCUMENTS

| | | |
|---|---|---|
| GB | 1199050 | 7/1970 |
| HU | 195241 | 6/1989 |
| JP | 58164631 | 9/1983 |
| JP | 2006104616 | 4/2006 |
| JP | 2006299486 | 11/2006 |
| JP | 2006348443 | 12/2006 |
| WO | WO-2008011020 | 1/2008 |
| WO | WO-2010057092 | 5/2010 |

OTHER PUBLICATIONS

PCT/US2009/064587 International Search Report and Written Opinion dated Mar. 4, 2010.

\* cited by examiner

*Primary Examiner* — Peter F Godenschwager
(74) *Attorney, Agent, or Firm* — Kilpatrick Townsend & Stockton LLP

(57) ABSTRACT

The present invention provides compositions for treating textiles, including carpet and other floor coverings. Compositions of the present invention, in some embodiments, can impart flame resistant and/or stain resistant properties to fibers, including synthetic fibers comprising polyolefins, polyamides, and polyesters such as polytrimethylene terephthalate.

4 Claims, No Drawings

COMPOSITIONS FOR TREATING TEXTILES AND CARPET AND APPLICATIONS THEREOF

RELATED U.S. APPLICATION DATA

The present application claims priority under 35 U.S.C. §119(e) to U.S. Provisional Patent Application Ser. No. 61/114,891, filed Nov. 14, 2008 and to U.S. Provisional Patent Application Ser. No. 61/153,577, filed Feb. 18, 2009, each of which is incorporated by reference in its entirety.

BACKGROUND OF THE INVENTION

Manufactures of textiles are continuously searching for compositions to enhance textile fiber performance and durability. In the carpet and floor coverings industry, for example, manufacturers desire compositions operable to render carpet fibers stain resistant as well as flame resistant. Fluorinated carbon compounds have been used extensively to impart water and oil repellency to textile and carpet fibers. Fluorocarbon compounds can provide both oil and water repellency simultaneously, unlike waxes, silicones, etc., which typically provide water repellency, but are somewhat oleophilic, and thus do not provide good oil repellency.

Fluorinated or perfluorinated alkyl compounds, when applied to fibers in sufficient amount, lower the surface tension of the fiber or fabric below the surface energy of water or oils that might be spilled onto the fabric. This allows these liquids to be removed before they can penetrate into the fiber or fabric. This is of great benefit for fibers and fabrics used in residential, commercial, and industrial settings as the useful life of the fibers and fabric is substantially increased.

Similarly, numerous flame retarding compounds have been developed for textiles, including carpets, to reduce or preclude the flammability of the natural or synthetic fibers contained therein. Inorganic and organic tin compounds have been used to reduce the flammability of polyamides. Moreover, aluminum compounds have also found applicability as flammability retardants. These compounds, however, have not demonstrated completely satisfactory results under several testing conditions.

In addition to developing stain repellant and fire retardant chemical species, manufactures have additionally developed techniques for effectively applying these chemical species to textile fibers. Manufactures, for example, have developed complex solutions and techniques to exhaust fluoropolymer compositions onto textile fibers. In view of these complex exhaustion solutions and techniques, several fiber compositions, including thermoplastic polyesters, remain resistant to accepting stain repellant and/or flame retarding chemical species.

Polytrimethylene terephthalate (PTT) is a polyester which demonstrates superior mechanical characteristics, weatherability, heat aging resistance and hydrolysis resistance making it an ideal candidate for carpeting, textiles and apparel, engineering plastics, nonwovens, films, and mono-filament applications. PTT is produced by condensation polymerization of 1,3-propane diol (PDO) and terephthalic acid.

PTT has been commercially available for over 50 years. Despite its advantageous physical and chemical properties, PTT has not found wide application due to the prohibitive cost of producing or obtaining PDO. However, in the 1990's, Shell Chemicals developed a low cost method of producing PDO suitable for PTT production. Moreover, an environmentally friendly process has subsequently been developed wherein a genetically modified strain of E. coli bacteria is fed a refined corn syrup and undergoes a fermentation process resulting in the production of PDO.

With cost efficient and environmentally friendly methods currently available for producing PDO, PTT is a viable replacement for polyolefin, polyamide, and other polyester fibers in textile and carpet applications. Nevertheless, PTT has demonstrated less than desirable flammability properties in textile and carpet applications, especially in applications wherein a fluoropolymer has been applied to textile fibers and carpet fibers.

SUMMARY

In view of the foregoing, the present invention provides compositions for treating textiles, including carpet and other floor coverings. Compositions of the present invention can impart flame resistant and/or stain resistant properties to fibers, including synthetic fibers comprising polyolefins, polyamides, and polyesters such as polytrimethylene terephthalate. The present invention additionally provides methods of applying compositions operable to impart desirable flame resistant and/or stain resistant properties to fibers, textiles, carpets and other floor coverings.

In one aspect, the present invention provides an aqueous dispersion comprising at least one dye leveler compound and a compound of Formula (I):

(I)

wherein $R^1$, $R^2$ and $R^3$ are independently selected from the group consisting of -hydrogen, -alkyl, -alkenyl, -alkynyl, -cycloalkyl, -fluoroalkyl, -chloroalkyl, -bromoalkyl, -fluoroalkenyl, -chloroalkenyl, -bromoalkenyl, -cycloalkyl, -heterocyclyl, -aryl, -heteroaryl, -alkyl-aryl, -alkyl-heteroaryl, -alkenyl-aryl, -alkenyl-heteroaryl, -aryl-alkyl, -heteroaryl-alkyl, -aryl-alkenyl, -heteroaryl-alkenyl, alkyl-OH, alkenyl-OH, -aryl-OH and -heteroaryl-OH; and wherein the alkyl, alkenyl, alkynyl, cycloalkyl, aryl and heteroaryl groups of $R^1$-$R^3$ are optionally and independently substituted one or more times with a substituent selected from the group consisting of -alkyl, -alkenyl, -fluoroalkyl, -chloroalkyl, -bromoalkyl, -aryl, —O-alkyl, —O-alkenyl, —O-aryl, —O-alkylene-aryl, -carboxyl, -hydroxyl, -halo and -nitro.

An aqueous dispersion, according to some embodiments of the present invention, comprises a compound of Formula (I) dispersed in a continuous aqueous phase. In some embodiments, the aqueous dispersion is an emulsion of a compound for Formula (I). In some embodiments, a compound of Formula (I) comprises an organophosphate or phosphoric acid ester. In some embodiments, an organophosphate ester comprises tris(1,3-dichloroisopropyl)phosphate, triphenyl phosphate, tricresyl phosphate or diphenyl cresyl phosphate or mixtures thereof.

In some embodiments, a compound of Formula (I) comprises the compound of Formula (IA):

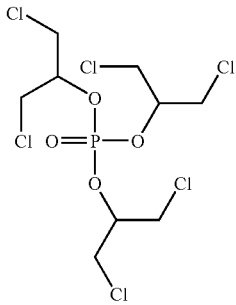

(IA)

Moreover, in some embodiments, the at least one dye leveler compound can comprise any dye leveler compound not inconsistent with the objectives of the present invention. Suitable dye leveler compounds for use in embodiments of an aqueous dispersion of the present invention can be selected according to the identity of the substrate to be dyed and/or the identity of the dye used.

In accordance with dyeing substrates, an aqueous dispersion comprising at least one dye leveler compound and a compound of Formula (I) can further comprise a dye component. In some embodiments, the dye component comprises at least one acid dye, cationic dye, disperse dye, fiber reactive dye, sulfur dye, vat dye or indigo or mixtures thereof.

In another aspect, the present invention provides an organic solution comprising a compound of Formula (I). In some embodiments of an organic solution, a compound of Formula (I) comprises an organophosphate or phosphoric acid ester as described herein. In some embodiments, an organic solution comprises a compound of Formula (I) and a polyalkylene glycol or polyalkylene glycol derivative. Moreover, in some embodiments, an organic solution further comprises at least one dye leveler compound.

In another aspect, the present invention provides an aqueous solution of a compound of Formula (II):

(II)

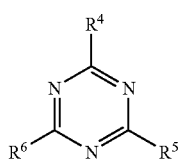

wherein $R^4$, $R^5$ and $R^6$ are independently selected from the group consisting of hydrogen, alkyl, alkenyl, alkynyl, cycloalkyl, alkoxy, heterocycl, aryl, heteroaryl, -alkyl-aryl, -aryl-alkyl, halo, —OH, —C(O)OR$^{16}$,

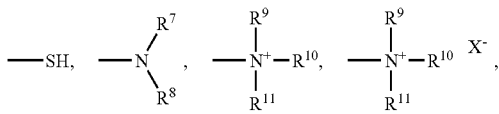

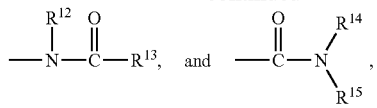

wherein $R^7$, $R^8$, $R^9$, $R^{10}$, $R^{11}$, $R^{12}$, $R^{13}$, $R^{14}$, $R^{15}$ and $R^{16}$ are independently selected from the group consisting of hydrogen, alkyl, alkenyl, alkynyl, alkoxy, cycloalkyl, heterocycl, aryl, heteroaryl, -alkyl-aryl, and -aryl-alkyl, —OH; and
wherein $X^-$ is independently selected from the group consisting of fluoride, chloride, bromide, iodide, hydroxide, carboxylate, phosphate, sulfate, and sulfide.

In some embodiments, a compound of Formula (II) is present in the aqueous solution in an amount of up to about 50 weight percent. In another embodiment, a compound of Formula (II) is present in an amount ranging from about 5 weight percent to about 40 weight percent.

In one embodiment of a compound of Formula (II), at least one of $R^4$, $R^5$, and $R^6$ is

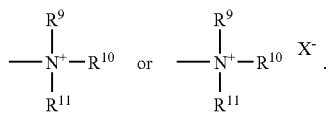

In some embodiments, a compound of Formula (II) comprises a salt of melamine, including an acid salt of melamine. Embodiments of the present invention contemplate any acid salt of melamine. In one embodiment, for example, a compound of Formula (II) is a melamine hydrochloride, melamine dihydrochloride, or a melamine trihydrochloride.

In another embodiment, a compound of Formula (II) is a salt of melamine and a phosphorus containing acid. In some embodiments, a phosphorus-containing acid comprises phosphoric acid, phosphorous acid, hypophosphorus acid, phosphonic acid, organophosphorus acids, or mixtures thereof. In one embodiment, a compound of Formula (II) is a melamine phosphate, melamine diphosphate, or a melamine triphosphate. In another embodiment, a compound of Formula (II) is a salt of melamine and a sulfur containing acid. In some embodiments, a sulfur containing acid comprises sulfuric acid, sulfonic acid, organosulfonic acids, hydrogen sulfite, sulfurous acid, or mixtures thereof. In one embodiment, a compound of Formula (II) is a melamine sulfate, a melamine disulfate, or a melamine trisulfate.

In some embodiments, a compound of Formula (II) is an acid salt of melamine and a polymer having one or more acid moieties. In one embodiment, for example, a compound of Formula (II) is an acid salt of melamine and a polymer comprising one or more vinyl acetate or maleic anhydride monomers.

In some embodiments, an aqueous solution of a compound of Formula (II) further comprises a compound of Formula (I) dispersed therein.

In another aspect, the present invention provides a substrate at least partially coated or treated with an aqueous dispersion comprising at least one dye leveler compound and a compound of Formula (I). As provided herein, in some embodiments, the aqueous dispersion further comprises a dye component.

Moreover, in some embodiments, the present invention provides a substrate at least partially coated or treated with an aqueous solution comprising a compound of Formula (II).

Substrates, in some embodiments, comprise cellulosic materials, including paper, wood, cellulose acetate fibers, and cotton materials, including, but not limited to, cotton fibers, woven cotton articles, and non-woven cotton articles. In other embodiments, a substrate comprises natural fibers in addition to cellulose fibers including, but not limited to, wool and silk fibers.

In another embodiment, a substrate comprises one or more synthetic fibers. Synthetic fibers, in some embodiments, comprise nylon (polyamide) fibers, polyester fibers such as PTT, polyethylene terephthalate (PET), polybutylene terephthalate (PBT), polyolefin fibers such as polypropylene, polyurethane fibers, polyacrylonitrile fibers, or combinations thereof. In some embodiments, for example, a substrate comprises a mixture or combination of synthetic fibers including PTT fibers combined with any one of polyester fibers such as PET and/or PBT fibers, polyamide fibers, polyolefin fibers such as polypropylene fibers, polyurethane fibers, and/or any combination thereof. In some embodiments, for example, a substrate comprises a combination of synthetic fibers including PTT fibers with natural fibers. Substrates comprising various combinations of fibers, in some embodiments of the present invention, are considered composite substrates.

In a further embodiment, a substrate comprises leather, thermoplastics, thermosets, metals, porcelain, carpet, masonry, stones, brick, wood, plastics, painted surfaces, and dyed surfaces.

In another aspect, the present invention provides a substrate treated with an organic solution comprising a compound of Formula (I). In some embodiments, a substrate can comprise any of the same described herein. In one embodiment, for example, a natural or synthetic fiber is treated with an organic solution comprising a compound of Formula (I) during one or more processing steps of the fiber. In some embodiments, for example, the organic solution comprising a compound of Formula (I) demonstrates one or more properties operable to protect the integrity of the fiber during processing.

In some embodiments, a substrate at least partially coated or treated with an aqueous dispersion or organic solution of a compound for Formula (I) and/or an aqueous solution of a compound of Formula (II) described herein is further treated with a fluorochemical component. The fluorochemical component, in some embodiments, comprises a fluorpolymer dispersion comprising plurality of fluoropolymer particles dispersed throughout an aqueous solution.

In some embodiments, the fluorochemical component is applied to a substrate separate or independent of a composition comprising a compound of Formula (I) and/or Formula (II). In other embodiments, a fluorochemical component is part of a composition comprising a compound of Formula (I) and/or Formula (II). In one embodiment, for example, a fluorochemical component is dispersed throughout an aqueous solution of a compound of Formula (II).

In some embodiments, a fluorochemical component is operable to impart stain resistant properties to the substrate in addition to the flame resistant properties imparted by a compound of Formula (I) and/or Formula (II). In some embodiments, a fluorochemical component is operable to impart water and/or oil repellency.

In another aspect, the present invention provides a composite fiber comprising a polymeric component and compound of Formula (I) disposed in the polymeric component. In some embodiments, the compound of Formula (I) is dispersed throughout the polymeric component. A polymeric component of a composite fiber, in some embodiments, comprises any thermoplastic or thermoset not inconsistent with the objectives of the present invention. In some embodiments, a polymeric component comprises a polyamide, polyester, polyolefin or polyacrylonitrile or combinations thereof. In some embodiments, a polyester comprises PTT, PET or PBT or a combination thereof. In some embodiments, a polyolefin comprises polyethylene, polypropylene or polybutylene or a combination thereof.

In another aspect, the present invention provides a latex composition comprising a plurality of first polymeric particles and a compound of Formula (I) and/or Formula (II). In some embodiments, a compound of Formula (I) comprises an organophosphate or phosphoric acid ester. In some embodiments, an organophosphate comprises tris(1,3-dichloroisopropyl)phosphate, triphenyl phosphate, tricresyl phosphate or diphenyl cresyl phosphate or mixtures thereof. Moreover, in some embodiments, a compound of Formula (II) comprises an acid salt of melamine, a salt of melamine and a phosphorus containing acid or combinations thereof.

Additionally, in some embodiments, the first polymeric particles comprise poly(acetates), poly(acrylates), polystyrene, polybutadiene, polyisoprene or polychloroprene or copolymers or mixtures thereof.

A latex composition, in some embodiments, further comprises a plurality of second polymeric particles. In some embodiments, the plurality of second polymeric particles comprises fluoropolymeric species.

Latex compositions described herein, according to some embodiments, are used in adhesive backing materials for carpet constructions. In one embodiment, for example, a latex composition comprising a compound of Formula (I) and/or Formula (II) is cured to produce a solid adhesive backing material for carpet constructions. In some embodiments, a latex composition of the present invention is used as a secondary backing for a carpet or floor covering construction.

In another aspect, the present invention provides a carpet or floor covering construction comprising a backing and a plurality of fibers coupled to the backing, wherein the plurality of fibers have associated therewith a compound of Formula (I) and/or Formula (II). In some embodiments, the plurality of fibers can comprise any natural or synthetic fiber or combination of fibers described herein. In one embodiment, the plurality of fibers comprise PTT fibers. In some embodiments, a compound of Formula (I) and/or Formula (II) is associated with surfaces of the plurality of fibers by electrostatic interactions, covalent bonds, dipole-dipole interactions or hydrophobic interactions or combinations thereof. In other embodiments, a compound of Formula (I) and/or Formula (II) is associated with surfaces of the plurality of fibers by mechanical engagement.

Moreover, in some embodiments, a carpet or floor covering construction further comprises fluorochemical component associated with surfaces of the plurality of fibers of the construction.

In some embodiments, the backing of the carpet or floor covering construction also comprises a compound of Formula (I) and/or Formula (II). The backing of the carpet or floor covering construction, in some embodiments, comprises a latex composition described herein comprising a plurality of first polymeric particles and a compound of Formula (I) and/or Formula (II). Additionally, in some embodiments, the backing of the carpet construction further comprises a fluorochemical component.

In another aspect, the present invention provides a method of making a composite fiber comprising a polymeric component and a compound of Formula (I) disposed in the polymeric component. In one embodiment, a method of making a composite fiber comprises compounding or blending a compound of Formula (I) with a melt of the polymeric component and extruding the melt into the fiber.

In another aspect, the present invention provides methods of enhancing the flammability resistance of substrates, including fibers and textiles and carpets or floor coverings made therefrom. In one embodiment, a method of enhancing the flammability resistance of a substrate comprises providing an aqueous dispersion comprising at least one dye leveler compound and a compound of Formula (I) and applying the aqueous dispersion to the substrate. In some embodiments, the aqueous dispersion further comprises a dye component. In some embodiments, methods of the present invention contemplate dyeing the substrate and imparting increased flammability resistance to the substrate in a single process or cycle.

In another embodiment, a method of enhancing the flammability resistance of a substrate comprises providing an organic solution comprising a compound of Formula (I) and applying the solution to the substrate.

A method of enhancing the flammability resistance of a substrate, in some embodiments, comprises providing an aqueous solution of a compound of Formula (II) and applying the aqueous solution to the substrate. An aqueous solution of a compound of Formula (II), in some embodiments, further comprises a compound of Formula (I) dispersed therein.

In some embodiments, methods of enhancing flammability resistance further comprise enhancing the stain resistant properties of the substrate. Enhancing the stain resistant properties of a substrate, in some embodiments, comprises providing a fluorochemical component and applying the fluorochemical component to the substrate.

In a further aspect, the present invention provides a method of providing a carpet or floor covering construction. A method of providing a carpet or floor covering construction, in some embodiments, comprises providing a plurality of fibers, coupling the fibers to a backing and applying to the plurality of fibers an aqueous dispersion comprising at least one dye leveler compound and a compound of Formula (I). In some embodiments, the aqueous dispersion further comprises a dye component.

In another embodiment, a method of providing a carpet or floor covering construction comprises providing a plurality of fibers, coupling the fibers to a backing and applying to the plurality of fibers an aqueous solution comprising a compound of Formula (II). In some embodiments, the aqueous solution of a compound of Formula (II) further comprises a compound of Formula (I) dispersed therein. In some embodiments, the backing of the carpet construction also comprises a compound of Formula (I) and/or Formula (II).

In some embodiments of providing a carpet or floor covering construction, a composition comprising compound of Formula (I) and/or Formula (II) is applied to the plurality of fibers prior to coupling of the fibers to the backing. In other embodiments, a composition comprising a compound of Formula (I) and/or Formula (II) is applied to the plurality of fibers subsequent to coupling the fibers to the backing.

In a further embodiment, a method of providing a carpet or floor covering construction comprises providing a plurality of composite fibers and coupling the plurality of composite fibers to a backing, the composite fibers comprising a polymeric component and a compound of Formula (I) disposed in the polymeric component.

These and other embodiments are described in greater detail in the detailed description which follows.

DETAILED DESCRIPTION

In the structural formulas provided herein and throughout the present specification, the following terms have the indicated meaning:

The term "alkyl" as used herein, alone or in combination, refers to a straight or branched chain saturated hydrocarbon radical having from one to 30 carbon atoms, for example $C_{1-8}$-alkyl or $C_{1-6}$-alkyl. Typical $C_{1-8}$-alkyl groups and $C_{1-6}$-alkyl groups include, but are not limited to e.g. methyl, ethyl, n-propyl, isopropyl, n-butyl, sec-butyl, isobutyl, tert-butyl, n-pentyl, 2-methylbutyl, 3-methylbutyl, 4-methylpentyl, neopentyl, n-pentyl, n-hexyl, 1,2-dimethylpropyl, 2,2-dimethylpropyl, 1,2,2-trimethylpropyl and the like. The term "$C_{1-8}$-alkyl" as used herein also includes secondary $C_{3-8}$-alkyl and tertiary $C_{4-8}$-alkyl. The term "$C_{1-6}$-alkyl" as used herein also includes secondary $C_{3-6}$-alkyl and tertiary $C_{4-6}$-alkyl.

The term "alkenyl" as used herein, alone or in combination, refers to a straight or branched chain hydrocarbon radical containing from two to 30 carbon atoms and at least one carbon-carbon double bond, for example $C_{2-8}$-alkenyl or $C_{2-6}$-alkenyl. Typical $C_{2-8}$-alkenyl groups and $C_{2-6}$-alkenyl groups include, but are not limited to, vinyl, 1-propenyl, 2-propenyl, iso-propenyl, 1,3-butadienyl, 1-butenyl, 2-butenyl, 3-butenyl, 2-methyl-1-propenyl, 1-pentenyl, 2-pentenyl, 3-pentenyl, 4-pentenyl, 3-methyl-2-butenyl, 1-hexenyl, 2-hexenyl, 3-hexenyl, 2,4-hexadienyl, 5-hexenyl and the like.

The term "alkynyl" as used herein alone or in combination, refers to a straight or branched hydrocarbon radical containing from two to 30 carbon atoms and at least one triple carbon-carbon bond, for example $C_{2-8}$-alkynyl or $C_{2-6}$-alkynyl. Typical $C_{2-8}$-alkynyl groups and $C_{2-6}$-alkynyl groups include, but are not limited to, ethynyl, 1-propynyl, 2-propynyl, 1-butynyl, 2-butynyl, 3-butynyl, 1-pentynyl, 2-pentynyl, 3-pentynyl, 4-pentynyl, 1-hexynyl, 2-hexynyl, 3-hexynyl, 5-hexynyl, 2,4-hexadiynyl and the like.

The term "cycloalkyl" as used herein, alone or in combination, refers to a non-aromatic hydrocarbon radical having from three to twelve carbon atoms, and optionally with one or more degrees of unsaturation, for example $C_{3-8}$-cycloalkyl. Such a ring may be optionally fused to one or more benzene rings or to one or more of other cycloalkyl ring(s). Typical $C_{3-8}$-cycloalkyl groups include, but are not limited to, cyclopropyl, cyclobutyl, cyclopentyl, cyclohexyl, cyclohexenyl, cycloheptyl, cycloheptenyl, cyclooctyl and the like.

The term "heterocyclic" or the term "heterocyclyl" as used herein, alone or in combination, refers to a three to twelve membered heterocyclic ring having one or more degrees of unsaturation containing one or more heteroatomic substitutions selected from S, SO, $SO_2$, O, or N, for example $C_{3-8}$-heterocyclyl. Such a ring may be optionally fused to one or more of another "heterocyclic" ring(s) or cycloalkyl ring(s). Typical $C_{3-8}$-heterocyclyl groups include, but are not limited to, tetrahydrofuran, 1,4-dioxane, 1,3-dioxane, piperidine, pyrrolidine, morpholine, piperazine, and the like.

The term "aryl" as used herein refers to a carbocyclic aromatic ring radical or to a aromatic ring system radical. Aryl is also intended to include the partially hydrogenated derivatives of the carbocyclic systems.

The term "heteroaryl" as used herein, alone or in combination, refers to an aromatic ring radical with for instance 5 to 7 member atoms, or to a aromatic ring system radical with for instance from 7 to 18 member atoms, containing one or more heteroatoms selected from nitrogen, oxygen, or sulfur heteroatoms, wherein N-oxides and sulfur monoxides and sulfur dioxides are permissible heteroaromatic substitutions; such as e.g. furanyl, thienyl, thiophenyl, pyrrolyl, imidazolyl, pyrazolyl, triazolyl, tetrazolyl, thiazolyl, oxazolyl, isoxazolyl, oxadiazolyl, thiadiazolyl, isothiazolyl, pyridinyl, pyridazinyl, pyrazinyl, pyrimidinyl, quinolinyl, isoquinolinyl, benzofuranyl, benzothiophenyl, indolyl, and indazolyl, and the like. Heteroaryl is also intended to include the partially hydrogenated derivatives of the heterocyclic systems enumerated below.

The "halo" as used herein refers to a monovalent halogen radical chosen from Group VII of the periodic table including fluoro, chloro, bromo, iodo.

The term "fluoroalkyl," as used herein, has the same respective meanings as alkyl, alkenyl, and alkynyl above provided that at least one carbon atom of the groups is substituted with at least one fluorine atom. In some embodiments, more than one carbon atom of the alkyl group is substituted with a plurality fluorine atoms.

The term "chloroalkyl," as used herein, has the same respective meanings as alkyl, alkenyl, and alkynyl above provided that at least one carbon atom of the groups is substituted with at least one chlorine atom.

The term "bromoalkyl," as used herein, has the same respective meanings as alkyl, alkenyl, and alkynyl above provided that at least one carbon atom of the groups is substituted with at least one bromine atom.

Compositions of the present invention can impart flame resistant and/or stain resistant properties to fibers, including synthetic fibers comprising polyolefins, polyamides, and polyesters such as polytrimethylene terephthalate. The present invention additionally provides methods of applying compositions operable to impart desirable flame resistant and/or stain resistant properties to fibers, textiles, carpets and other floor coverings.

In one aspect, the present invention provides an aqueous dispersion comprising at least one dye leveler compound and a compound of Formula (I):

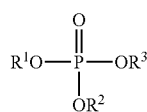
(I)

wherein $R^1$, $R^2$ and $R^3$ are independently selected from the group consisting of -hydrogen, -alkyl, -alkenyl, -alkynyl, -cycloalkyl, -fluoroalkyl, -chloroalkyl, -bromoalkyl, -fluoroalkenyl, -chloroalkenyl, -bromoalkenyl, -cycloalkyl, -heterocyclyl, -aryl, -heteroaryl, -alkyl-aryl, -alkyl-heteroaryl, -alkenyl-aryl, -alkenyl-heteroaryl, -aryl-alkyl, -heteroaryl-alkyl, -aryl-alkenyl, -heteroaryl-alkenyl, alkyl-OH, alkenyl-OH, -aryl-OH and -heteroaryl-OH; and wherein the alkyl, alkenyl, alkynyl, cycloalkyl, aryl and heteroaryl groups of $R^1$-$R^3$ are optionally and independently substituted one or more times with a substituent selected from the group consisting of -alkyl, -alkenyl, -fluoroalkyl, -chloroalkyl, bromoalkyl, -aryl, —O-alkyl, —O-alkenyl, —O-aryl, —O-alkylene-aryl, -carboxyl, -hydroxyl, -halo and -nitro.

An aqueous dispersion, according to some embodiments of the present invention, comprises a compound of Formula (I) dispersed in a continuous aqueous phase. In some embodiments, the aqueous dispersion is an emulsion of a compound for Formula (I). In some embodiments, a compound of Formula (I) comprises an organophosphate or phosphoric acid ester. In some embodiments, an organophosphate ester comprises tris(1,3-dichloroisopropyl)phosphate, triphenyl phosphate, tricresyl phosphate or diphenyl cresyl phosphate or mixtures thereof.

In some embodiments, a compound of Formula (I) comprises the compound of Formula (IA):

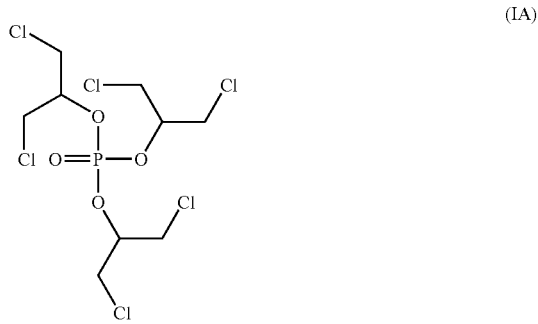 [SMILES: O=P(OC(CCl)CCl)(OC(CCl)CCl)OC(CCl)CCl]
(IA)

In some embodiments, an aqueous dispersion of the present invention comprises a compound of Formula (I) in an amount up to about 90 weight percent. In some embodiments, an aqueous dispersion comprises a compound of Formula (I) in an amount ranging from about 10 weight percent to about 80 weight percent. In another embodiment, an aqueous dispersion comprises a compound of Formula (I) in an amount ranging from about 20 weight percent to about 45 weight percent. In further embodiments, an aqueous dispersion comprises a compound for Formula (I) in an amount less than about 10 weight percent or greater than about 90 weight percent.

In some embodiments, an aqueous dispersion of the present invention comprises a compound of Formula (I) in an amount ranging from about 0.1 percent to about 5 percent based on weight of goods (owg). In other embodiments, an aqueous dispersion comprises a compound of Formula (I) in an amount ranging from about 0.5 percent to about 3 percent owg. In a further embodiment, an aqueous dispersion comprises a compound of Formula (I) in an amount less than 0.1 percent owg or greater than 5 percent owg.

Moreover, at least one dye leveler compound can comprise any dye leveler compound not inconsistent with the objectives of the present invention. Suitable dye leveler compounds for use in some embodiments of an aqueous dispersion of the present invention can be selected according to the substrate to be dyed and/or the identity of the dye.

In some embodiments, for example, a dye leveler component comprises dodecyl benzenesulfonic acid (DDBSA), non-ionic ethoxylated fatty alcohols, non-ionic ethoxylate fatty amines, naphthalene sulfonic acid sodium salts, sodium dioctyl sulfosuccinate or combinations thereof.

In accordance with dyeing substrates, an aqueous dispersion comprising at least one dye leveler compound and a compound for Formula (I), in some embodiments, further comprises a dye component. In some embodiments, a dye component comprises at least one acid dye, cationic dye, disperse dye, fiber reactive dye, sulfur dye, vat dye or indigo or mixtures thereof.

Dyes for dyeing substrates, such as synthetic textile fibers, can be selected according to several parameters, including the identity of the fibers. Various dyes are well known and can comprise any of the same known to one of skill in the art. Acid dyes, in some embodiments, for example, comprise fused ring structures. In some embodiments, acid dyes comprise anthraquinone and derivatives thereof. In other embodiments, acid dyes comprise azo dyes and derivatives thereof. In a further embodiment, acid dyes comprise triphenylmethane and related chemical structures. Moreover, in some embodiments, cationic dyes comprise basic dyes.

Acid dyes, cationic dyes and/or disperse dyes for use in aqueous compositions of the present invention, in some embodiments, are commercially available from Clariant Corporation of Charlotte, N.C., Dystar L.P. of Charlotte, N.C. and Huntsman Corporation of Charlotte, N.C.

Aqueous dispersions of the present invention can comprise any amount of dye component required to effectuate the desired dyed result on fibers. In some embodiments, aqueous dispersions of the present invention comprise varying amounts of dyes of different colors which are combined to produce the desired color. The 1931 or 1976 CIE chromaticity scale can be used as a reference, in some embodiments, when combining various dyes to produce a desired color.

In another aspect, the present invention provides an organic solution comprising a compound of Formula (I). In some embodiments of an organic solution, a compound of Formula (I) comprises an organophosphate or phosphoric acid ester. In some embodiments, an organophosphate ester comprises tris(1,3-dichloroisopropyl)phosphate, triphenyl phosphate, tricresyl phosphate or diphenyl cresyl phosphate or mixtures thereof.

In some embodiments, an organic solution comprises a compound of Formula (I) and a polyalkylene glycol or polyalkylene glycol derivative. In one embodiment, for example, an organic solution comprises a polyethylene glycol ester such as PEG 400 monolauarate, PEG 400 dilaurate, PEG 200 monooleate, PEG 300 monooleate, PEG 300 monostearate, PEG 400 cocoate, PEG 400 monooleate, PEG 400 dioleate, PEG 400 monostearate, PEG 600 dioleate or PEG 600 monolaurate or combinations thereof.

Moreover, in some embodiments, an organic solution further comprises at least one dye leveler compound. Suitable dye leveler compounds, in some embodiments, can comprise any of the same described herein.

In another aspect, the present invention provides an aqueous solution of a compound of Formula (II)

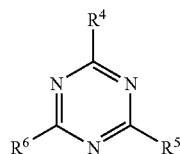

wherein $R^4$, $R^5$ and $R^6$ are independently selected from the group consisting of hydrogen, alkyl, alkenyl, alkynyl, cycloalkyl, alkoxy, heterocycl, aryl, heteroaryl, -alkyl-aryl, -aryl-alkyl, halo, —OH, —C(O)OR$^{16}$,

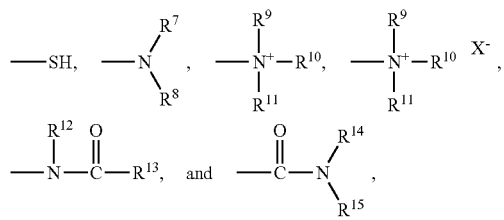

wherein $R^7$, $R^8$, $R^9$, $R^{10}$, $R^{11}$, $R^{12}$, $R^{13}$, $R^{14}$, $R^{15}$ and $R^{16}$ are independently selected from the group consisting of hydrogen, alkyl, alkenyl, alkynyl, alkoxy, cycloalkyl, heterocycl, aryl, heteroaryl, -alkyl-aryl, and -aryl-alkyl, —OH; and wherein X$^-$ is independently selected from the group consisting of fluoride, chloride, bromide, iodide, hydroxide, carboxylate, phosphate, sulfate, and sulfide.

In some embodiments, a compound of Formula (II) is present in the aqueous solution in an amount of up to about 50 weight percent. In another embodiment, a compound of Formula (I) is present in an amount ranging from about 5 weight percent to about 40 weight percent.

In one embodiment of a compound of Formula (II), at least one of $R^4$, $R^5$, and $R^6$ is

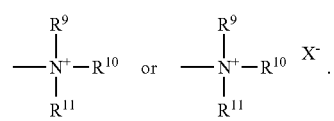

In some embodiments, a compound of Formula (II) comprises a salt of melamine, including an acid salt of melamine. Embodiments of the present invention contemplate any acid salt of melamine. In one embodiment, for example, a compound of Formula (II) is a melamine hydrochloride, melamine dihydrochloride, or a melamine trihydrochloride.

In another embodiment, a compound of Formula (II) is a salt of melamine and a phosphorus containing acid. In some embodiments, a phosphorus-containing acid comprises phosphoric acid, phosphorous acid, hypophosphorus acid, phosphonic acid, organophosphorus acids, or mixtures thereof. In one embodiment, a compound of Formula (II) is a melamine phosphate, melamine diphosphate, or a melamine triphosphate. In another embodiment, a compound of Formula (II) is a salt of melamine and a sulfur containing acid. In some embodiments, a sulfur containing acid comprises sulfuric acid, sulfonic acid, organosulfonic acids, hydrogen sulfite, sulfurous acid, or mixtures thereof. In one embodiment, a compound of Formula (II) is a melamine sulfate, a melamine disulfate, or a melamine trisulfate.

In some embodiments, a compound of Formula (II) is an acid salt of melamine and a polymer having one or more acid moieties. In one embodiment, for example, a compound of Formula (II) is an acid salt of melamine and a polymer comprising one or more vinyl acetate or maleic anhydride monomers.

In some embodiments, a composition comprising an aqueous solution of a compound of Formula (II) further comprises urea. Urea, according to some embodiments, is present in the aqueous solution in an amount up to about 5 weight percent. In some embodiments, urea is introduced into the aqueous solution as urea hydrochloride, urea phosphate, urea sulfate, or mixtures thereof. In some embodiments urea hydrochloride, urea sulfate, and/or urea phosphate serve as an acid in aqueous solution. As a result, in some embodiments, a compound of Formula (II) is a salt formed from melamine and urea hydrochloride, urea sulfate, and/or urea phosphate.

In another aspect, the present invention provides a substrate at least partially coated or treated with an aqueous dispersion comprising at least one dye leveler compound and a compound of Formula (I). As provided herein, in some embodiments, the aqueous dispersion further comprises a dye component. Moreover, in some embodiments, the present invention provides a substrate at least partially coated or treated with an aqueous solution comprising a compound of Formula (II).

Substrates, in some embodiments, comprise cellulosic materials, including paper, wood, cellulose acetate fibers, and cotton materials, including, but not limited to, cotton fibers, woven cotton articles, and non-woven cotton articles. In other embodiments, a substrate comprises natural fibers in addition to cellulose fibers including, but not limited to, wool and silk fibers.

In another embodiment, a substrate comprises one or more synthetic fibers. Synthetic fibers, in some embodiments, comprise polyamide fibers, polyester fibers such as PTT, polyethylene terephthalate (PET), polybutylene terephthalate (PBT), polyolefin fibers such as polypropylene, polyurethane fibers, polyacrylonitrile fibers, or combinations thereof. In some embodiments, for example, a substrate comprises a mixture or combination of synthetic fibers including PTT fibers combined with any one of polyester fibers such as PET and/or PBT fibers, polyamide fibers, polyolefin fibers such as polypropylene fibers, polyurethane fibers, and/or any combination thereof. In some embodiments, for example, a substrate comprises a combination of synthetic fibers including PTT fibers with natural fibers. Substrates comprising various combinations of fibers, in some embodiments of the present invention, are considered composite substrates.

In a further embodiment, a substrate comprises leather, thermoplastics, thermosets, metals, porcelain, carpet, masonry, stones, brick, wood, plastics, painted surfaces, and dyed surfaces.

In some embodiments, a compound of Formula (I) and/or Formula (II) is associated with one or more surfaces of the substrate. In some embodiments, a compound of Formula (I) and/or Formula (II) is associated with a surface of the substrate through electrostatic interactions, covalent bonds, dipole-dipole interactions, van der Waals interactions or hydrophobic interactions or combinations thereof. In other embodiments, a compound of Formula (I) and/or Formula (II) is associated with the surface of a substrate by mechanical engagement. In one embodiment, for example, a compound of Formula (I) and/or Formula (II) is trapped between a plurality of filaments of a strand, such as a PTT strand. In some embodiments, a compound of Formula (I) and/or Formula (II) is associated with a surface of the substrate through chemical and mechanical interactions.

As discussed further herein, a substrate comprising at least one surface having associated therewith a compound of Formula (I) and/or Formula (II), in some embodiments, can demonstrate increased resistance to flammability. In one embodiment, for example, a substrate comprising PTT fibers alone or in combination with other fibers demonstrates increased resistance to flammability when at least partially coated or treated with an aqueous dispersion comprising at least one dye leveler compound and a compound of Formula (I). In another embodiment, a substrate comprising PTT fibers alone or in combination with other fibers demonstrates increased resistance to flammability when at least partially coated or treated with an aqueous solution of a compound of Formula (I).

In some embodiments, a substrate at least partially coated or treated with an aqueous dispersion or organic solution of a compound for Formula (I) and/or an aqueous solution of a compound of Formula (II) described herein is further treated with a fluorochemical component. The fluorochemical component, in some embodiments, comprises a fluorpolymer dispersion comprising plurality of fluoropolymer particles dispersed throughout an aqueous solution.

In some embodiments, the fluorochemical component is applied to a substrate independent of a composition comprising a compound of Formula (I) and/or Formula (II). In other embodiments, a fluorochemical component is part of a composition comprising a compound of Formula (I) and/or Formula (II). In one embodiment, for example, a fluorochemical component is dispersed throughout an aqueous solution of a compound of Formula (II).

In some embodiments, the fluorochemical component comprises fluorinated or perfluorinated organic compounds. Fluorinated or perfluorinated organic compounds, in some embodiments, comprise fluorinated monomers, fluorinated oligomers, fluorinated polymers or combinations thereof. In some embodiments, a fluorochemical component comprises one or a plurality of fluoropolymers.

In one embodiment, fluoropolymers suitable for use in compositions of the present invention comprise polymeric species having $C_4$ to $C_{20}$ fluorinated or perfluorinated chains. In another embodiment, fluoropolymers comprise a polymeric species having $C_6$ perfluorinated chains. In some embodiments, fluoropolymers comprise polymeric species having fluorinated or perfluorinated chains greater than $C_{20}$. In some embodiments, fluoropolymers having perfluorinated chains are produced from monomers of Formula (III):

$$R_f-(CH_2)_n-P \qquad (III)$$

wherein P is a polymerizable moiety, $R_f$ is a straight chained or branched perfluoroalkyl group and n is an integer from 0 to 3. In some embodiments, $R_f$ comprises a $C_4$ to $C_{20}$ perfluorinated alkyl group. In other embodiments, $R_f$ comprises a fluorinated or perfluorinated alkyl group of at least $C_{20}$. In some embodiments, P comprises a site of unsaturation operable to undergo radical polymerization. In one embodiment, for example, P comprises an vinyl functionality, allyl functionality, acrylic functionality or methacrylic functionality. In other embodiments, P comprises a functionality operable to undergo condensation polymerization.

In some embodiments, fluoropolymers comprise fluoroalkyl methacrylates, fluoroalkyl acrylates, fluoroalkyl aryl urethanes, aliphatic fluoroalkyl urethanes, fluoroalkyl allyl urethanes, fluoroalkyl urethane acrylates, fluoroalkyl acrylamides, fluoroalkyl sulfonamide acrylates, fluoroalkyl sulfonamide methacrylates, fluoroalkyl sulfonamide urethanes, fluoroalkylesters, fluoroesters or fluoroethers or mixtures thereof. In other embodiments, fluoropolymers comprise polytetrafluoroethylene (PTFE), fluorinated ethylene-propylene (FEP), perfluoroalkoxy resin (PFA), polychlorotrifluoroethylene (PCTFE), ethylene-tetrafluoroethylene (EPTFE), polyvinylidene fluoride (PVDF), or polyvinyl fluoride (PVF) or mixtures thereof. In some embodiments, the fluoropolymers are crosslinked.

Fluoropolymers, in some embodiments of compositions of the present invention, comprise an aqueous dispersion or emulsion comprising a plurality of fluoropolymer particles. In one embodiment, fluoropolymer particles have an average size ranging from about 1 nm to about 500 nm. In another embodiment, fluoropolymer particles have an average size ranging from about 100 nm to about 400 or from about 200 nm to about 300 nm. In some embodiments, fluoropolymer particles have an average size ranging from about 10 nm to about 90 nm, from about 20 nm to about 60, or from about 30 nm to about 50 nm. In a further embodiment, fluoropolymer particles have an average size less than about 1 nm or greater than about 500 nm.

Fluoropolymer particles, in some embodiments, comprise any of the fluoropolymer species recited herein, including fluoropolymers having $C_4$ to $C_{20}$ or $C_6$ or greater than $C_{20}$ fluorinated or perfluorinated alkyl chains. In some embodiments, suitable fluoropolymers have a molecular weight ranging from about 100 to about 1,000,000. In some embodiments, fluoropolymer particles are dispersed throughout the continuous aqueous phase resulting in a colloid. Moreover, in some embodiments, fluoropolymers are anionic, cationic or non-ionic. Anionic and/or cationic charges, in some embodiments, can be imparted to fluoropolymers through the incorporation of monomers having anionic and/or cationic moieties.

In some embodiments, a fluorpolymer is commercially available from Peach States Labs of Rome, Ga. under the Sartech trade designation including, but not limited to Sartech Geo 8168 and Sartech 13-60. In other embodiments a fluoropolymer is commercially available from Dupont of Wilmington, Del. under the trade designation ZONYL®. In some embodiments, a fluoropolymer is commercially available from Daikin Industries, Inc. of Osaka, Japan under the Unidyne trade designation including, but not limited to, TG7114, TG2113, TG2112, TG581, TG7411 and TG2213.

In another aspect, the present invention provides a composite fiber comprising a polymeric component and compound of Formula (I) disposed in the polymeric component. In some embodiments, the compound of Formula (I) is dispersed throughout the polymeric component. A polymeric component of a composite fiber in some embodiments, comprises any thermoplastic or thermoset not inconsistent with the objectives of the present invention. In some embodiments, a polymeric component comprises a polyamide, polyester, polyolefin or polyacrylonitrile or combinations thereof. In some embodiments, a polyester comprises PTT, PET or PBT or a combination thereof. In some embodiments, a polyolefin comprises polyethylene, polypropylene or polybutylene or a combination thereof. Additionally, in some embodiments, a composite fiber further comprises a dye component.

A composite fiber can have any desired dimensions. In some embodiments, a composite fiber is a chopped fiber or a staple fiber. In other embodiments, a composite fiber is a continuous fiber.

In another aspect, the present invention provides a latex composition comprising a plurality of first polymeric particles and a compound of Formula (I) and/or Formula (II). In some embodiments, a compound of Formula (I) comprises an organophosphate or phosphoric acid ester. In some embodiments, an organophosphate ester comprises tris(1,3-dichloroisopropyl)phosphate, triphenyl phosphate, tricresyl phosphate or diphenyl cresyl phosphate or mixtures thereof. Moreover, in some embodiments, a compound of Formula (II) comprises an acid salt of melamine, a salt of melamine and a phosphorus containing acid or combinations thereof.

In some embodiments, a compound of Formula (I) and/or Formula (II) is present in an amount up to about 25 weight percent of the latex composition. In other embodiments, a compound of Formula (I) and/or Formula (II) is present in an amount ranging from about 0.001 weight percent to about 20 weight percent or from about 1 weight percent to about 15 weight percent. In another embodiment, a compound of Formula (I) and/or Formula (II) is present in an amount ranging from about 5 weight percent to about 10 weight percent of the latex composition. In some embodiments, a compound of Formula (II) is solubilized in an aqueous phase of the latex.

Additionally, in some embodiments, the first polymeric particles comprise poly(acetates), poly(acrylates), polystyrene, polybutadiene, polyisoprene or polychloroprene or copolymers or mixtures thereof.

A latex composition, in some embodiments, further comprises a plurality of second polymeric particles. In some embodiments, the plurality of second polymeric particles comprises fluoropolymeric species. Fluoropolymeric species suitable for use in latex compositions of the present invention, in some embodiments, can comprise any of the same described herein.

In some embodiments, a latex composition further comprises filler materials such as calcium carbonate.

Latex compositions described herein, according to some embodiments, are used in adhesive backing materials for carpet constructions. In one embodiment, for example, a latex composition comprising a compound of Formula (I) and/or Formula (II) is cured to produce a solid adhesive backing material for carpet constructions. In some embodiments, a latex composition of the present invention is used as a secondary backing for a carpet or floor covering construction.

In another aspect, the present invention provides a carpet or floor covering construction comprising a backing and a plurality of fibers coupled to the backing, wherein the plurality of fibers have associated therewith a compound of Formula (I) and/or Formula (II). In some embodiments, the plurality of fibers can comprise any natural or synthetic fiber or combination of fibers described herein. In one embodiment, the plurality of fibers comprise PTT fibers. In some embodiments, a compound of Formula (I) and/or Formula (II) is associated with surfaces of the plurality of fibers by electrostatic interactions, covalent bonds, dipole-dipole interactions or hydrophobic interactions or combinations thereof. In other embodiments, a compound of Formula (I) and/or Formula (II) is associated with surfaces of the plurality of fibers by mechanical engagement.

In some embodiments, the backing of the carpet or floor covering construction also comprises a compound of Formula (I) and/or Formula (II). The backing of the carpet or floor covering construction, in some embodiments, comprises a latex composition described herein comprising a plurality of first polymeric particles and a compound of Formula (I) and/or Formula (II).

Moreover, in some embodiments, a carpet or floor covering construction further comprises fluorochemical component associated with surfaces of the plurality of fibers and/or backing of the construction.

In some embodiments wherein a fluorochemical component is additionally associated with surfaces of the plurality of fibers and/or backing, the carpet or floor covering construction has an oil repellency of at least 5 according to American Association of Textile Chemists and Colorists (AATCC) 118. In other embodiments, the carpet or floor covering construction has an oil repellency of at least 6 according to AATCC 118. In a further embodiment, the carpet or floor covering construction has an oil repellency of at least 7 according to AATCC 118.

Furthermore, in some embodiments, wherein a fluorochemical component is additionally associated with surfaces of the plurality of fibers and/or backing, the carpet or floor covering construction has a water/alcohol repellency of at least 6 according to AATCC 193. In other embodiments, the carpet or floor covering construction has a water/alcohol repellency of at least 7 or at least 8 according to AATCC 193.

As provided herein, a carpet or floor covering construction comprising a plurality of fibers having associated therewith a compound of Formula (I) and/or Formula (II) can demonstrate enhanced resistance to flammability. A carpet construction described herein, in some embodiments, for example, passes the methenamine "pill test" for flammability as set forth by the Department of Commerce (DOC) FF1-70. Moreover, in some embodiments, a carpet or floor covering construction of the present invention demonstrates a Class I rating according to the Flooring Radiant Panel Test (ASTM E-648) by displaying a critical radiant flux of at least 0.45 watts/cm$^2$.

In one embodiment, for example, a carpet construction of the present invention comprising PTT fibers, alone or in combination with other fibers, having associated therewith a compound of Formula (I) can pass the "pill test' for flammability as set forth by the Department of Commerce (DOC) FF1-70. Additionally, a carpet construction of the present invention comprising PTT fibers, alone or in combination with other fibers, having associated therewith a compound of Formula (I) can demonstrate a Class I rating according to the Flooring Radiant Panel Test (ASTM E-648) by displaying a critical radiant flux of at least 0.45 watts/cm$^2$.

In some embodiments, for example, a carpet composition comprising a plurality of polyester fibers having a compound of Formula (I) associated therewith passes the methenamine pill test according to DOC FF1-70. Additionally, a carpet composition comprising a plurality of polyester fibers having a compound of Formula (I) associated therewith achieves a Class I rating according to the Flooring Radiant Panel Test (ASTM E-648) by displaying a critical radiant flux of at least 0.45 watts/cm$^2$. In some embodiments, the polyester carpet composition displays a critical radiant flux of at least 0.60 watts/cm$^2$ or 0.70 watts/cm$^2$. In another embodiment, the polyester carpet composition displays a critical radiant flux of at least 0.80 watts/cm$^2$ or 0.90 watts/cm$^2$. In some embodiments, the polyester fibers of the carpet construction comprise PTT, PET, or PBT or combinations thereof.

In another aspect, the present invention provides a method of making a composite fiber comprising a polymeric component and a compound of Formula (I) disposed in the polymeric component. In one embodiment, a method of making a composite fiber comprises compounding or blending a compound of Formula (I) with a melt of the polymeric component and extruding the melt into a fiber. In some embodiments, the polymeric melt comprising the compound of Formula (I) is extruded by passing through one or more openings of a spinnerette. Moreover, in some embodiments, a dye component can be compounded or blended with the polymeric melt and compound of Formula (I) using conventional solution dyeing techniques.

In another aspect, the present invention provides methods of enhancing the flammability resistance of substrates, including fibers and textiles and carpets or floor coverings made therefrom. In one embodiment, a method of enhancing the flammability resistance of a substrate comprises providing an aqueous dispersion comprising at least one dye leveler compound and a compound for Formula (I) and applying the aqueous dispersion to the substrate. In some embodiments, the aqueous dispersion further comprises a dye component. In some embodiments, methods of the present invention contemplate dyeing the substrate and imparting increased flammability resistance to the substrate in a single process or cycle.

In another embodiment, a method of enhancing the flammability resistance of a substrate comprises providing an organic solution comprising a compound of Formula (I) and applying the solution to the substrate.

In some embodiments, applying the aqueous dispersion or organic solution to the substrate comprises spray coating, dip coating, foaming, exhausting, passing the substrate through kiss rollers or spreading onto or coating the substrate through a head box, optionally with the aid of a doctor blade or any other application or exhaustion method or technique known to one of skill in the art. Moreover, in some embodiments, the aqueous dispersion is applied in a continuous process or a batch process as described herein.

In another embodiment, a method of enhancing the flammability resistance of a substrate comprises providing an aqueous solution of a compound of Formula (II) and applying the aqueous solution to the substrate. An aqueous solution of a compound of Formula (II), in some embodiments, further comprises a compound of Formula (I) dispersed therein.

In some embodiments, methods of enhancing flammability resistance further comprise enhancing the stain resistant properties of the substrate. Enhancing the stain resistant properties of a substrate, in some embodiments, comprises providing a fluorochemical component and applying the fluorochemical component to the substrate. A fluorochemical component, in some embodiments, comprises any of the same described herein.

In a further aspect, the present invention provides a method of providing a carpet or floor covering construction. A method of providing a carpet or floor covering construction, in some embodiments, comprises providing a plurality of fibers, coupling the fibers to a backing and applying to the plurality of fibers an aqueous dispersion comprising at least one dye leveler compound and a compound of Formula (I). In some embodiments, the aqueous dispersion further comprises a dye component.

In another embodiment, a method of providing a carpet or floor covering construction comprises providing a plurality of fibers, coupling the fibers to a backing and applying to the plurality of fibers an aqueous solution comprising a compound of Formula (II). In some embodiments, the aqueous solution of a compound of Formula (II) further comprises a compound of Formula (I) dispersed therein. In some embodiments, the backing of the carpet construction also comprises a compound of Formula (I) and/or Formula (II).

In some embodiments, once an aqueous dispersion of a compound of Formula (I) or an aqueous solution of a compound of Formula (II) is applied to the plurality of fibers of the carpet or floor covering construction, the construction is heated. The carpet construction, in some embodiments, is heated to a temperature of up to about 100° C. In some embodiments, the carpet or floor covering construction is heated for a time period ranging from about 10 seconds to about 1 hour. In another embodiment, the carpet construction is heated for a time period ranging from about 30 seconds to about 10 minutes or from about 1 minute to about 5 minutes. In a further embodiment, the carpet construction is heated for a time period ranging from about 90 seconds to about 3 minutes.

In some embodiments, an aqueous dispersion comprising at least one dye leveler compound, a dye component and a compound of Formula (I) is applied to the plurality of carpet fibers in a continuous dyeing process. In one embodiment, for example, an aqueous dispersion of the present invention is applied to the plurality fibers of the carpet construction at the desired wet pick up, and the carpet construction is subsequently steamed for the desired period of time. Subsequent to steaming, the carpet construction is rinsed and extracted.

In other embodiments, an aqueous dispersion comprising at least one dye leveler compound, a dye component and a compound of Formula (I) is applied to the plurality of carpet fibers in a batch dyeing process. In the batch dyeing process, an aqueous dispersion of the present invention is added to a bath having the desired liquor ratio. The carpet construction comprising the plurality of fibers is disposed in the bath and boiled for a time period of about one hour. In some embodiment, the carpet construction is boiled under ambient atmospheric conditions. In other embodiments, the carpet construction is boiled under pressure in dye beck or any suitable pressurized dyeing apparatus. Subsequent to boiling, the carpet construction is removed from the bath and rinsed.

In some embodiments of providing a carpet or floor covering construction, a composition comprising a compound of Formula (I) and/or Formula (II) is applied to the plurality of fibers prior to coupling of the fibers to the backing. In other embodiments, a composition comprising a compound of Formula (I) and/or Formula (II) is applied to the plurality of fibers subsequent to coupling the fibers to the backing.

A method of providing a carpet or floor covering construction, in some embodiments, further comprises providing a fluorochemical component and applying the fluorochemical component to the plurality of fibers of the carpet construction. In some embodiments, the fluorochemical component is applied to the plurality of fibers in a manner consistent with that of the aqueous dispersion comprising a compound of Formula (I) or the aqueous solution comprising a compound of Formula (II). In some embodiments, for example, a fluorochemical component is applied to the plurality of fibers in a continuous process or a batch process.

In a further embodiment, a method of providing a carpet or floor covering construction comprises providing a plurality of composite fibers and coupling the plurality of fibers to a backing, the composite fibers comprising a polymeric component and a compound of Formula (I) disposed in the polymeric component.

Some embodiments of the present invention will not be illustrated in the following specific, non-limiting examples.

EXAMPLE 1

Preparation of an Aqueous Dispersion Comprising a Dye Leveler Compound and a Compound of Formula (I)

An aqueous dispersion of the present invention comprising at least one dye leveler compound and a compound of Formula (I) was prepared according to the following procedure.

An organic solution comprising a polyester dye leveler compound, tridecyl alcohol (8-9.5 mol ethoxylate) and a compound of Formula (I) as tris(1,3-dichloroisopopyl)phosphate was provided. The polyester dye leveler compound was the alkaline catalyzed reaction product of an ethoxylated nonylphenol and soybean oil. The polyester dye leveler compound in combination with the tridecyl alcohol was obtained from Peach State Labs of Rome, Ga. under the trade designation Isotac NC. Moreover, the tris(1,3-dichloroisopopyl) phosphate of the organic solution was obtained from Cellular Technologies International, Inc. of Kennesaw, Ga. under the trade designation of Celltech PEX. Table I summarizes the contents of the organic solution.

TABLE I

Aqueous Dispersion Contents

| Component | Weight Percent |
|---|---|
| Polyester Dye Leveler[1] | 27.3 |
| Tridecyl Alcohol | 18.2 |
| Tris(1,3-dichloroisopopyl)phosphate[2] | 54.5 |

[1]Isotac NC commercially available from Peach State Labs of Rome, GA.
[2]Celltech PEX commercially available from Cellular Technologies International, Inc. of Kennesaw, Georgia 8.75 g of the organic solution were added per liter of water to produce an aqueous dispersion comprising the polyester dye leveler compound and tris(1,3-dichloroisopopyl)phosphate.

EXAMPLE 2

Application of an Aqueous Dispersion Comprising a Dye Leveler Compound and a Compound of Formula (I) to a Substrate The aqueous dispersion prepared in Example 1 was injected with a sufficient amount of wine colored disperse dye in route to application to a sample of PTT carpet fibers by a Kuster type continuous applicator at 400% wet pick up and pH of 4.0. The PTT carpet sample demonstrated about 50 ounces of face fiber weight. The treated PTT carpet was subsequently steamed for about 6 minutes in a vertical steamer with saturated steam, rinse and extracted.

EXAMPLE 3

Application of a Fluoropolymer Component to a Substrate Treated with an Aqueous Dispersion Comprising a Dye Leveler Compound and a Compound of Formula (I)

The PTT carpet fibers of Example 2 were subsequently treated with a fluoropolymer component of Sartech Geo 8168 in a continuous after-treatment. 3.0% owg of Sartech Geo 8168 fluoropolymer component was applied to the PTT carpet fibers at a wet pick up of 400% at a pH of about 1.5. The pH of the fluoropolymer component was controlled with urea sulfate. The PTT carpet construction was then steamed for 2 minutes in a vertical steamer, rinsed, extracted and dried.

EXAMPLE 4

Preparation of a Carpet Construction Comprising a Compound of Formula (I)

A latex composition comprising a compound of Formula (I) and having the formulation provided in Table II was applied to the backing of the PTT carpet fibers of Example 3. The PTT carpet construction was subsequently dried in a standard industry drier until the latex back coating dried.

TABLE II

Latex Composition Contents

| Component | Weight Percent |
|---|---|
| Carboxylated sytrene-butadiene latex[3] | 24.6 |
| Tris(1,3-dichloroisopropyl)phosphate[4] | 4.3 |
| Deionized Water | 5.3 |
| Calcium Carbonate filler | 64.0 |
| Foaming Agent[5] | 0.9 |
| Thickener[6] | 0.9 |

[3]Dow chemicals Latex LN 4687
[4]Celltech PEX commercially available from Cellular Technologies International, Inc. of Kennesaw, Georgia
[5]Stanfax 565 commercially available from Para-Chem of Dalton, GA
[6]Paragum T-111 commercially available from Para-Chem of Dalton, GA

EXAMPLE 5

Flammability Testing of PTT Carpet Constructions Comprising a Compound of Formula (I)

Methenamine Pill Test—DOC FF1-70

Eight PTT carpet samples prepared in accordance with Example 4 were subjected to methenamine pill testing according to DOC FF1-70. The eight 9 inch×9 inch PTT carpet samples were placed in an oven to remove moisture and then allowed to cool in a moisture free container. Each sample was subsequently placed in a box which eliminated air currents. A methenamine tablet was placed in the center of each PTT carpet sample and ignited with a match. Eight out of the eight PTT carpet samples passed the pill test by failing to exhibit charring or burning more than three inches in any direction from the center of the sample.

Radiant Panel Testing—ASTM E-648

PTT carpet samples prepared in accordance with Example 4 were subjected to radiant panel testing according to ASTM E-648. Each PTT carpet sample achieved a Class I rating by demonstrating a critical radiant flux of at least 0.45 watts/cm$^2$. The highest critical radiant flux achieved by a PTT carpet sample of the present invention comprising a compound of Formula I was 0.92 watts/cm$^2$.

EXAMPLE 6

Preparation of a Composition Comprising an Aqueous Solution of a Compound of Formula (II)

16 g of melamine powder obtained from DSM (Netherlands) were added to 67 ml of water in a beaker. Following addition of the melamine powder, 18 ml of urea hydrochloric acid (Novoc ACL) was added dropwise to the beaker with stirring until the pH of the solution reached about 1.5. Addition of the urea hydrochloric acid composition solubilized the melamine powder forming a compound of Formula I (melamine hydrochloride).

A fluoropolymer component comprising polymeric particles having $C_6$ perfluorinated alkyl chains was obtained from Peach State Labs under the trade designation Sartech 13-60. 4.5 ml of the fluoropolymer component was added to 30 ml of the melamine hydrochloride solution. The fluoropolymer particles had a average size ranging from about 2 nm to about 500 nm. Introduction of the fluoropolymer particles produced a colloid.

EXAMPLE 7

Application of a Composition Comprising an Aqueous Solution of a Compound of Formula (II) to a Substrate The composition prepared in Example 6 was heated to a temperature of about 65° C. and applied to a sample of PTT carpet fibers of about 50 ounce of face fiber weight and backed with a standard latex pre-coat. Subsequent to application of the solution, the PTT carpet fibers were steamed in a vertical steamer for about 60 seconds. The PTT carpet fibers were removed from the steamer and rinsed with cold water. Excess water was removed from the PTT carpet fibers, and the PTT fibers were dried and conditioned.

A methylene pill weighing about 1 gram was placed on the PTT fibers treated with the composition prepared in Example 6. The methylene pill was ignited with a butane lighter and consumed the PTT fibers underneath and proximate the pill. Once the PTT fibers underneath and proximate to the methylene pill were consumed, the flame was extinguished and no additional burning of PTT fibers was realized. As a result, a charred region about the size of a quarter was the only evidence of the combustion of the methylene pill, thereby passing DOC FF1-70.

The results of the methenamine pill test for the PTT carpet fibers treated with a composition of the present invention is in stark contrast to the results of a methylene pill test for untreated PTT fibers. A sample of untreated PTT carpet fibers of about 50 ounce of face fiber weight and backed with a standard latex pre-coat was subjected to an identical methylene pill test as described above. Ignition of the methylene pill resulted in combustion of substantially all of the untreated PTT fibers leaving nothing but the carpet backing at the end of test.

EXAMPLE 8

Preparation of a Latex Comprising a Compound of Formula (II)

A carpet latex solution was produced comprising 0-192 wet parts of Dow Latex LN 4687 (carboxylated styrene-butadiene latex), 0-7 wet parts of an acrylic thickener, 0-600 dry parts of calcium carbonate filler, 0-5 parts of foam stabilizer (sodium polyacetate), 1-50 parts of melamine powder, and 0-50 wet parts of Sartech 13-60 fluoropolymer component.

EXAMPLE 9

Preparation of a Carpet Construction Comprising a an Aqueous Solution of a Compound of Formula (II)

A composition of the present invention was prepared in accordance with Example 6. The composition was then heated to a temperature of about 65° C. and applied to a sample of PTT carpet fibers of about 50 ounce of face fiber weight. After the composition was applied, the PTT carpet fibers steamed in a vertical steamer for about 60 seconds. After drying the PTT carpet fibers, a latex back coating solution prepared in accordance with Example 8 was applied to PTT carpet backing. The PTT carpet construction was subsequently dried in a standard industry drier until the latex back coating dried. The PTT carpet construction was then conditioned for a period of 2 hours.

Once conditioned, the PTT carpet construction was subjected to flammability testing. A methylene pill weighing about 1 gram was placed on the PTT carpet fibers treated with the composition prepared in Example 6. The methylene pill was ignited with a butane lighter and consumed the PTT fibers underneath and proximate the pill. Once the PTT fibers underneath and proximate to the methylene pill were consumed, the flame was extinguished and no additional burning of PTT fibers was realized. As a result, a charred region about the size of a quarter was the only evidence of the combustion of the methylene pill, thereby passing DOC FF1-70.

For comparison, a prior art PTT carpet construction comprising 50 ounce of face fiber weight and a standard latex back coating was obtained and subjected to an identical methylene pill test as described above. Ignition of the methylene pill resulted in complete combustion of the untreated PTT fibers leaving nothing but the carpet backing at the end of test.

The superior resistance to flammability provided to substrates, especially textiles including fiber and carpet constructions, by compositions of the present invention is a surprising result. The excellent resistance to flammability exhibited by PTT fibers treated with compositions of the present invention and articles made therefrom such as carpet renders PTT a viable alternative to traditional synthetic fibers such as polyamides, polyolefins, PET, and PBT.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. An aqueous dispersion comprising:
a dye component;
at least one dye leveler compound; and
a compound of Formula (I):

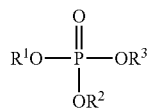

(I)

wherein $R^1$, $R^2$ and $R^3$ are independently selected from the group consisting of -fluoroalkenyl, -chloroalkenyl, -bromoalkenyl, -cycloalkyl, and -heterocyclyl,
wherein the chloroalkyl, chloroalkenyl, and cycloalkyl, groups of $R^1$-$R^3$ are optionally and independently substituted one or more times with a substituent selected from the group consisting of -alkyl, -alkenyl, -fluoroalkyl, -chloroalkyl, -bromoalkyl, -aryl, —O-alkyl, —O-alkenyl, —O-aryl, —O-alkylene-aryl, -carboxyl, -hydroxyl, -halo and -nitro.

2. The aqueous dispersion of claim 1, wherein the compound of Formula (I) comprises tris(1,3-dichloroisopropyl) phosphate.

3. The aqueous dispersion of claim 1, wherein the compound of Formula (I) is present in an amount ranging from about 10 weight percent to about 80 weight percent.

4. The aqueous dispersion of claim 1, wherein the dye component comprises an acid dye, cationic dye, disperse dye, fiber reactive dye, sulfur dye, vat dye or mixtures thereof.

* * * * *